United States Patent Office 3,191,669
Patented June 29, 1965

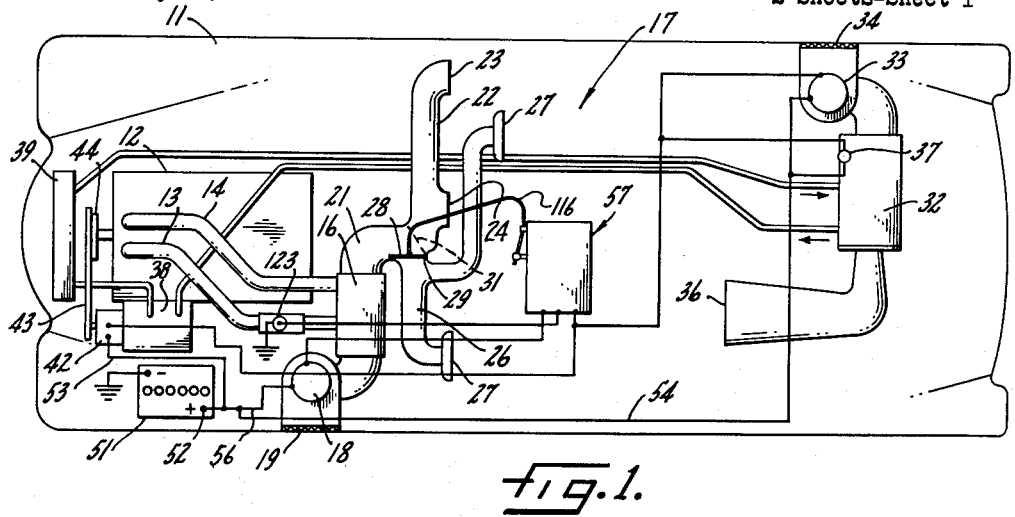

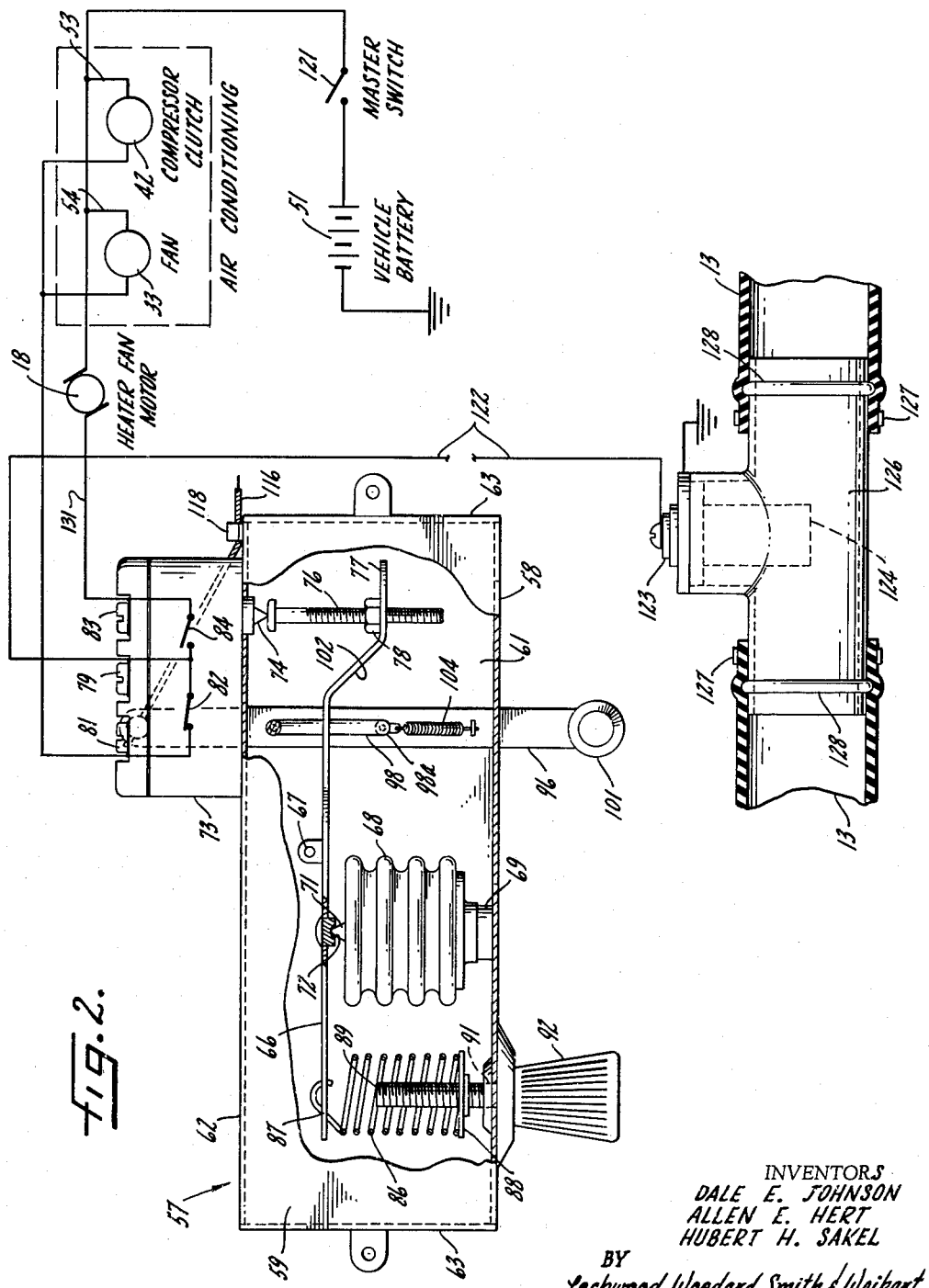

3,191,669
AUTOMATIC VEHICLE TEMPERATURE CONTROL
Dale E. Johnson, 1619 6th St.; Allen E. Hert, 1001 R St.; and Hubert H. Sakel, R.R. 3, Box 274, all of Bedford, Ind.
Filed May 21, 1962, Ser. No. 196,179
5 Claims. (Cl. 165—25)

This invention relates generally to temperature control systems and more particularly to temperature control systems for automotive vehicles.

In recent years, motor vehicle manufacturers have marketed vehicles and particularly automobiles which have means intended for establishing a desired passenger compartment temperature regardless of the outside ambient temperature. In order to do so the vehicles have been equipped with heating units as well as cooling units. Normally the heating unit employs engine coolant which is circulated by the engine water pump and air flow is provided principally by an electric motor driven fan. The cooling unit incorporates refrigeration mechanisms including a compressor which is normally driven by the engine. Again, air flow is provided by an electric motor driven fan.

Heretofore, in vehicles which have not incorporated a cooling system, but in which the heat output of the heater was to be controlled according to the passenger compartment temperature, the usual means of controlling the heat output has been to employ a thermostatically controlled valve in the water line from the engine to the heat exchanger core of the heater. Operation of the heater fan has been controlled manually. Also, for effective operation of a defroster supplied with warm air from the heater core, it is necessary to adjust the temperature control to be certain that maximum water flow through the heater core is provided, and also to adjust a damper control to direct the entire air flow output from the heater to the defroster duct. This has not only required the attention to control of two separate knobs, but also has caused an attendant time lag of substantial duration until adequate water flow is established. Of course, another two manual operations are required when the defrosting operation is completed and return to automatic temperature control is desired.

In vehicles equipped with air conditioning as well as heating units, it has been the typical practice to provide a master control whereby either the heating system is deactivated and the cooling system activated or vice versa depending on the outside ambient condition. With such systems, in addition to the usual complexity which they involve, there is a problem which is encountered on the type of day where the ambient temperature together with the cloud cover conditions make it impossible for either the air-conditioner alone or the heater alone to maintain a satisfactory vehicle temperature. For example, if the desired temperature in the passenger compartment is 75° F., and the outside ambient temperature is 50° F., heater operation is required to bring the passenger compartment temperature up to the desired level, so long as the sun is not shining. However, if the clouds are scattered, it is usually a short length of time until the sun is shining brightly whereupon the inside car temperature may well exceed the desired level of 75°. Thus, when the sun shines heater operation is not desired and the air-conditioner must be employed. This has normally required continuous attention by the operator and then with entirely unsatisfactory results.

Finally, heretofore there has been available no simple means for equipping with an automatic means for controlling temperature, a vehicle which originally was provided without any automatic temperature control equipment. This means that the person who buys a vehicle which has heating equipment but with no automatic control, has been forced to operate with such equipment for the entire life or at least his period of use of the vehicle.

It is therefore a general object of the present invention to provide improved means for automatic temperature control of a vehicle.

It is a further object of this invention to provide an extremely simple and trouble-free means for automatic control of temperature in a vehicle equipped with a heater.

It is a further object of the present invention to provide means for easily equipping a standard vehicle which has a straight manual control of its heating unit with an automatic control at nominal expense.

It is a further object of the present invention to provide means for automatically maintaining temperature in the passenger compartment of a vehicle at a stable point regardless of ambient temperature conditions.

It is a further object of the present invention to provide means for maintaining a specified temperature in a vehicle equipped with air heating and cooling equipment and requiring absolutely no attention to the temperature control once a setting has been made.

It is a still further object of the present invention to provide an automatic temperature control for a vehicle heater which can be converted with a single manual movement to a direct defrosting function without regard to the vehicle temperature.

Described briefly, a typical embodiment of the present invention is incorporated in an engine-driven motor vehicle having a liquid cooled engine, heater and air cooler, with separate defroster and compartment heating outlets and a damper for excluding air from the heating outlet when desired. In the typical embodiment, a control unit is provided which includes a case which may be conveniently mounted to the vehicle body in the passenger compartment, usually behind or under the instrument panel. The control unit includes a snap-action switch having normally-open and normally-closed contacts. An adjustable thermally-responsive element is provided for operation of the switch in response to passenger compartment temperatures. The case is suitably perforated to encourage air flow therethrough.

A manually operable lever is mounted in the case and has connected thereto a Bowden wire which is coupled to the damper in the heater duct. The manual lever is also operatively associated with the switch whereby it can actuate the switch independently of the thermally responsive unit upon placing the manual lever in a predetermined position thereof. At this position the lever also locates the damper whereby it excludes air flow from the passenger compartment heating outlets and directs all of the heater air output to the defroster outlets.

Air supply to the heater is provided by an electrically driven heater fan and the normally-open contacts of the micro-switch are connected in circuit with the heater fan motor and the vehicle battery. Thereby the heater fan motor is de-energized whenever the normally-open contacts are open and is energized whenever they are closed either by the action of the manual lever or by the response of the thermally responsive element to a passenger compartment temperature below a desired level. Also in series with the vehicle battery and the heater fan motor is a switch having a temperature sensing element in the coolant line between the engine and the heater. In this manner, the heater fan circuit can be maintained in an open condition so long as the coolant (hereinafter called water) from the engine to the heater is below an acceptable temperature.

The micro-switch also has its normally closed contacts in a circuit with the air-conditioner blower fan motor whereby cool air will be provided so long as the contacts are maintained closed. However, upon sensing of a passenger compartment temperature below a desired level, the temperature responsive element will open the normally-closed contacts and open the circuit through the cooling fan motor.

The full nature of the invention will be understood from the accompanying drawings and the following description and claims:

FIG. 1 is a schematic plan view of an automobile having a liquid cooled engine, heater, air-conditioner, and incorporating a typical embodiment of the present invention.

FIG. 2 is a schematic diagram illustrating the principal electrical circuit features and control mechanism according to the typical embodiment of the invention.

FIG. 3 is a front elevation of the control mechanism case or housing, illustrating the manual controls thereon.

FIG. 4 is an end view of the control mechanism assembly with an end cover plate removed and illustrating certain interior details.

Referring to FIG. 1, the automobile body outline is designated by reference numeral 11 and the automobile includes a liquid cooled engine 12 having water conduits 13 and 14 extending therefrom to the heater 16. Typically the conduits 13 and 14 are heater hose and conduit 13 supplies hot water from the engine to the heater core.

The heater 16 is supplied with air for the passenger compartment 17 by means of a fan having an electric drive motor 18. The fan inlet 19 is provided at some location on the body of the vehicle which is aerodynamically neutral such as at the fender side or fender top or at the cowl adjacent the side of the vehicle. In this manner, air flow through the fan and heater which might otherwise be caused by ram effect at higher vehicle speeds, is avoided. While a neutral inlet position is not mandatory, it does tend to facilitate control of vehicle temperature where changes in vehicle speeds are substantial, such as between city traffic speeds and open highway speeds.

The air flow output of the heater is convyed through passageway 21 to the heater duct portion 22 having passenger compartment heating outlets 23 and 24, for example, and through passageway 26 to the defroster outlets 27, for example. For clarity of illustration, fewer heater and defroster outlets are shown in the drawing than are usually provided in the vehicle. A damper 28 is pivotally mounted at 29 to the heater outlet ducting and is movable to a position 31 shown by the dotted lines wherein the entire air flow output from the heater is directed to the defroster outlets.

An air-conditioning system is also provided and may typically include the evaporator unit 32, a fan driven by an electric motor 33 with the fan inlet 34 in a neutral position as described above, and a cool air outlet 36. It may also include a by-pass valve 37 which is electrically operable. Refrigerant is supplied by compressor 38 through a condenser 39 to the evaporator 32. Compressor 38 is driven through the electrically operated clutch 42 by the belt 43 from the engine crankshaft pulley 44. Evaporated refrigerant is returned from evaporator 32 to the compressor.

As shown in FIG. 1, the vehicle battery 51 having its negative terminal grounded to the vehicle, has its positive terminal 52 connected through conductor 53 to the air-conditioning compressor clutch 42, through conductor 54 to the air-conditioner fan motor 33 and by-pass valve 37, and through conductor 56 to the heater fan motor 18. The clutch 42, air-conditioner fan motor 33, by-pass valve 37, and the heater fan motor 18 are all returned to ground through control unit 57 which will now be described.

Referring to FIGS. 2, 3 and 4, the control unit 57 includes a case having a generally rectangular form with a front face 58, top 59, bottom 61 and rear wall 62. It also has end cover plates 63 on each end. The cover plates as well as the rear wall and the bottom of the case are usually provided with a number of holes 64 to facilitate air circulation through the case.

A balance lever 66 is pivotally mounted to the case by means of the shaft 67 extending between the top and bottom 59 and 61 of the case respectively. A bellows 68 has one end 69 thereof mounted to the inside of the front wall 58 of the case and has a pointed projection 71 at the opposite end thereof engaging the seat 72 secured to the balance lever 66. Thus, expansion of the bellows in response to increases of temperature of air flowing through the case is effective to move the balance lever clockwise as viewed from the top in FIG. 2.

A snap-action switch 73, of the type manufactured by Micro-Switch Company, for example, is mounted to the case and has an operating button 74 extending inside the rear wall 62 of the case. An adjusting screw 76 is threadedly received in the end portion 77 of the balance lever and is secured in place by the locknut 78. Thus it is seen that rotation of the balance lever counterclockwise is effective to move switch button 74 to operate the switch 73. In the illustrated example, the switch may be understood to have a common terminal 79, a terminal 81 connected to the normally closed contacts 82 of the switch, and a terminal 83 connected to the normally open contacts 84 of the switch.

To establish means for conveniently manually adjusting the temperature at which switch 73 is actuated by the balance lever 66, an adjusting spring 86 is connected at 87 to the balance lever and is connected to the threaded nut 88 which is threadedly engaged with the threaded shaft 89 having an unthreaded portion 91 mounted for rotation in the front wall 58 of the case. A temperature setting knob 92 is secured to the outer end of the shaft 89 and is provided with a pointer 93 whereby registry with a selected one of the temperature markings 94 on the front wall 58 can be manually provided to obtain operation of switch 73 by bellows 68 at the selected temperature.

A manually operable "automatic-defrost" lever 96 is pivotally mounted to the case by means of the shaft 97. Also, as is apparent in FIG. 4, an arm 98 having the general shape of an inverted L is pivotally mounted to the case by means of the shaft 97 and has a pin 99 therein which is received in an aperture in the lever 96 whereby the arm 98 can be rotated with respect to its shaft axis 97 by operating the lever 96. A knob 101 is provided at the front end of the lever 96 to facilitate manual operation thereof.

Of course, the case can take configurations other than that shown, so long as a suitable frame is provided for support of the various elements of the control unit.

As is apparent by comparing FIGS. 2 and 4, the arm 98, particularly the downwardly extending portion 98a thereof, is in a position to engage the offset portion 102 of the balance lever 66 upon movement of the manual lever 96 to the right-hand location thereof in the defrost notch 103 in the front wall 58 of the case. The spring 104 shown in FIG. 4 serves to pull the lever 96 up into the notch 103 upon positioning of the lever in the right-hand extreme of the slot 106. By thus engaging the offset portion 102 of the balance lever 66, the screw 76 is forceably engaged with the operating button of the switch 73 regardless of the condition of the bellows 68.

In contrast, with the lever 96 engaged in the "automatic" notch 107 of the front panel 58 of the case, it is the bellows operation which controls the operation of the switch button 74.

At the rear end 108 of the manual lever 96, there are provided apertures 109 intended to receive the pin 111 of the defroster damper cable clamp 112 which is secured thereto by a suitable spring clip 113. The clamp 112 is provided with an aperture 114 therethrough to receive the wire portion of Bowden cable 116 (FIG. 1), the wire being secured to the clamp by the set screw 117. The Bowden cable 116 may be clamped to the case by means of the clamp 118 which may be mounted either to the rear wall 62 of the case or to one of the end cover plates 63. The other end of the cable 116 is secured to the outlet duct from the heater 16 of FIG. 1 and the other end of the wire is secured to the damper 28. Accordingly, movement of the manually operated lever 96 to the defrost notch 103 not only causes a positive and preferential operation of the switch 73 but also closes the damper 28 whereby the entire heater air output is directed to the defroster outlets 27.

Referring further to FIG. 2, the electrical circuit employed according to the present invention can be readily understood. For the control of the vehicle heater, a first circuit may be described as the series connection of the vehicle battery 51, a master switch 121 which may be the ignition switch of the vehicle for example, the heater fan motor 18, the normally open contacts 84 of the switch 73, the common conductor 122, the normally open contacts of the thermally responsive switch 123 and back to the battery through ground.

The switch 123 is normally open until the temperature sensing unit thereof 124 rises to a predetermined temperature whereupon the switch closes. This switch is mounted in a brass casing 126 which may be inserted in water line 13, for example, by connecting each end of a heater hose to one end of the brass unit by means of hose clamps 127. The annular ridges 128 in the brass fitting assure a tight fit of the heater hose to the fitting by applying hose clamps to the hose at points which are between the ridges 128.

A second circuit, which may be described as the cooling system control circuit, includes the vehicle battery 51, master switch 121, the air-conditioning fan motor 33, the normally closed contacts 82 of switch 73, the conductor 122, switch 123 and back through ground to the battery. Another circuit like the foregoing circuit is provided and includes the air-conditioning compressor clutch 42. Additional identical circuits including other electrical elements of the cooling system, such as valve 37 of FIG. 1 for example, may also be provided.

It may be observed at this point that by virtue of the provision of the switch 123 in the ground return from the heater and air-conditioner electrical units, neither of the units can be energized until the water temperature from the vehicle engine has risen to an acceptable level to assure that when the heater fan is operated the air circulated thereby will be warm. It will be recognized, however, that if desired, the common terminal 79 of the switch 73 can be returned directly to ground. In this instance, operation of the vehicle air-conditioner could begin immediately in the event the passenger compartment temperature were at a level which would demand a cooling function. In this instance, if it were desired to prevent the heater from blowing cold air in the system when the heating function was desired, the switch 123 could be connected in series in the line 131 between the heater fan motor 18 and the normally open contact terminal 83 of switch 73.

From the foregoing description, it can be recognized that with the manually operated lever in the "automatic" notch and with the temperature adjustment knob set for the desired passenger compartment temperature, completely automatic temperature control is provided according to the present invention. In a vehicle equipped with an air cooling system as well as a heater, a desired temperature can be provided regardless of the external ambient temperature conditions.

By virtue of the complete automatic feature of the present invention, we remedy the safety hazard presented by the temperature control systems heretofore available, which necessitated continuously looking for and adjusting temperature. Where the switch 73 is the type which simultaneously closes and opens the normally open and normally closed contacts respectively, and is employed in a vehicle having a cooling system as well as a heating system, a continuous flow of air can be provided. On the other hand, if desired, the switch 73 can be such as to provide a delay between the opening and the closing functions or require a measure of additional travel of the operating member to close the second set of contacts in which case the transition from the heating to a cooling function would not be immediate. This may be found desirable where continuous air flow is not required and a slightly less precise temperature can be tolerated.

A preset, thermostatically operated, immersion switch 123 prevents the waste of using the heater and also the cold air-conditioning in a car before the water has warmed enough to provide a flow of warm air from the heater. The unit eliminates the need for a two-speed motor on the heater fan and also eliminates separate temperature and defroster controls thus providing a cost benefit and facilitating the operation. The direct reading dial on the temperature adjustment knob also provides a further simplification of control whereby the vehicle occupant need not guess at the correct position for a desired passenger compartment temperature. The elimination of any water control valve or the necessity therefor, eliminates a common source of trouble present in conventional heating systems.

It can thus be appreciated from the foregoing description that all of the objects recited above plus other objects not specifically mentioned are achieved by the present invention and many benefits can be derived therefrom particularly from the standpoints of durability, simplicity of installation, economy of construction and installation, versatility, facility of operation and accuracy of temperature control.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a vehicle having a compartment, a motor heating a fluid, and an air heater heated by said fluid with a fluid conduit connected between said heater and motor to convey said fluid in a fluid path through said motor and heater, and having an electric fan motor and fan for moving air through said heater and into the compartment, a compartment temperature control circuit comprising:

said fan motor;

a source of electrical energy coupled to said fan motor;

and a first temperature responsive electrical switch means coupled to said source and to said fan motor to complete the circuit, said first switch means being located in said compartment remote from said heater to respond to compartment temperatures to open the circuit at compartment temperatures above a predetermined level;

and second temperature responsive electrical switch means in series with said first switch means and located to respond to temperature of said fluid in said conduit to open said circuit at a fluid temperature below a predetermined level.

2. In a vehicle having a compartment, a motor heating a fluid, an air heater heated by said fluid with a fluid conduit connected between said heater and motor to convey said fluid in a fluid path through said motor and heater, and having an electric heater fan motor and fan for moving air through said heater and into the compartment, and having an air cooling system with a cooling fan and cooling fan motor, a compartment temperature control system comprising:

a source of electrical energy coupled to said fan motors;

a first temperature responsive electrical switch means having normally open and normally closed switch contacts, said means being located to respond to compartment temperature to open said normally-closed contacts at temperatures below a predetermined level and to close said normally-open contacts at temperatures below a predetermined level;

a heater fan circuit including said source, said heater fan motor, and said normally-open contacts in series;

and a cooling fan circuit including said source, said cooling fan motor, and said normally-closed contacts in series.

3. In a vehicle having a compartment, a motor heating a fluid, an air heater heated by said fluid, with a fluid conduit connected between said heater and motor to convey said fluid in a fluid path through said motor and heater, and having an electric heater fan motor and fan for moving air through said heater and into the compartment, and having an air cooling system electrically operable to supply cool air to the compartment, a control system comprising:

a source of electrical energy coupled to said fan motor and said air cooling system; and and a first electrical switch having an operator operating normally-open and normally-closed switch contacts; a temperature responsive actuator located to respond to compartment temperature and engaging said operator, said actuator moving in one direction in response to falling temperatures and thereby moving said operator to open said normally-closed contacts at temperatures below a predetermined level and to close said normally-open contacts at temperatures below a predetermined level;

a heater fan circuit including said source, said heater fan motor, and said normally-open contacts in series;

and an air cooling system including an air conditioner fan and motor therefor, a cool air outlet, an evaporator between said air conditioner fan and said cool air outlet, and a cooling system circuit, said circuit including said source, said air conditioner fan motor and said normally-closed contacts in series, to energize said cooling system for supplying cool air to the compartment during closure of said normally-closed contacts.

4. In a vehicle having a passenger compartment with a window, a motor heating a fluid, and an air heater heated by said fluid, with a fluid conduit connected between said heater and motor to convey said fluid in a fluid path through said motor and heater, and the vehicle having a first outlet disposed principally for heating purposes and a second outlet disposed principally for window defrosting purposes, and a passageway coupling said heater to said outlets and a damper in said passageway to selectively decouple said first outlet from said heater, and the vehicle having a fan and an electric fan drive motor for moving air through said heater, said passageway and said outlets, a passenger compartment temperature controller comprising:

a frame;

a switch having normally-open contacts and an operating member;

a circuit including in series relation a source of electrical energy, the said fan drive motor, and said normally-open contacts;

a thermally responsive unit mounted to said frame and having a portion operatively associated with said switch operating member and having a portion subject to passenger compartment air temperature to close said contacts in response to temperatures below a predetermined level;

and a manually operable element operatively associated with said switch operating member to close said contacts in a predetermined manually selectable position of said element, independent of the air temperature;

and means coupling said element to said damper to decouple said first outlet from said heater when said element is in said predetermined position.

5. A controller as set forth in claim 4 further comprising:

a thermally responsive switch having contacts in said circuit and having a portion communicating with said fluid to close the contacts of said thermally responsive switch in response to fluid temperatures above a predetermined level.

References Cited by the Examiner
UNITED STATES PATENTS

| 1,703,235 | 2/29 | Heath. | |
| 2,024,385 | 12/35 | Persons | 165—26 |
| 2,446,677 | 8/48 | Vaughan et al. | |
| 2,450,478 | 10/48 | Johnson | 165—26 |
| 2,583,661 | 1/52 | Morrison | 200—140 X |
| 2,656,114 | 10/53 | Woods. | |
| 2,735,657 | 2/56 | Owen | 165—43 |
| 2,870,296 | 1/59 | Heal | 200—140 |
| 2,953,356 | 9/60 | Soule. | |
| 3,103,568 | 9/63 | Lieberman et al. | 200—140 |

CHARLES SUKALO, *Primary Examiner.*